(12) United States Patent
Laude

(10) Patent No.: US 6,417,939 B1
(45) Date of Patent: Jul. 9, 2002

(54) POLARIZING FILTER AND ITS MANUFACTURING METHOD

(75) Inventor: Jean-Pierre Laude, Saint Cyr la Riviere par Saclas (FR)

(73) Assignee: Highwave Optical Technologies, Lannion (FR)

( * ) Notice: Subject to any disclaimer, the term of this patent is extended or adjusted under 35 U.S.C. 154(b) by 0 days.

(21) Appl. No.: 09/537,670

(22) Filed: Mar. 29, 2000

(30) Foreign Application Priority Data

Mar. 30, 1999 (FR) .............................. 99 03974

(51) Int. Cl.⁷ ................................................ G03H 1/02
(52) U.S. Cl. ...................... 359/3; 359/352; 204/192.34; 216/2; 430/2; 430/321
(58) Field of Search ................ 359/3, 352; 204/192.34; 216/2; 430/2, 321

(56) References Cited

U.S. PATENT DOCUMENTS

| 3,046,839 A | | 7/1962 | Bird et al. | |
| 3,235,630 A | | 2/1966 | Doherty et al. | |
| 4,131,506 A | * | 12/1978 | Namba et al. | 204/192.34 |
| 4,359,373 A | * | 11/1982 | Hammer | 204/192.34 |
| 4,456,515 A | | 6/1984 | Krueger et al. | |
| 4,514,479 A | | 4/1985 | Ferrante | |

FOREIGN PATENT DOCUMENTS

| JP | 57-112705 | | 7/1982 | |
| JP | 60230102 | * | 4/1984 | ................. 359/352 |
| JP | 60-230102 | | 11/1985 | |
| JP | 62231901 | * | 10/1987 | .................... 430/2 |

* cited by examiner

Primary Examiner—Cassandra Spyrou
Assistant Examiner—Craig Curtis
(74) Attorney, Agent, or Firm—Arent Fox Kintner Plotkin & Kahn

(57) ABSTRACT

This invention relates to a transmission-polarizing filter comprising a substrate (1) and a partially metallized grating (2) carried by this substrate (1).

The grating is a holographic grating, having a profile (3) with facets (4, 5) with, alternately, positive slopes (4) and negative slopes (5), whereas one of both sets of these facets with positive or negative slopes is partially metallized.

The filter is manufactured by making a holographic grating on a substrate, by metallizing the said substrate and by machining the said substrate partially according to an ionic process.

10 Claims, 6 Drawing Sheets

POLARIZING FILTER AND ITS MANUFACTURING METHOD

FIELD OF THE INVENTION

This invention relates to a polarising filter and its manufacturing method.

Polarising filters are subject to numerous optical applications, either to form polarised luminous fluxes or to select within a luminous flux carrying various polarisations, one of them being of particular interest.

BACKGROUND OF THE INVENTION

Certain transparent materials, at least in a given spectral domain, exhibit polarising properties and the first polarising filters have been made with such materials. Linear polarisations are considered generally.

More recently, numerous techniques have been developed and in particular (for example in the U.S. Pat. No 3,046,839), it has been suggested to make structures including metallized grids for the manufacture of polarisers.

The aim of the invention is to provide such a filter and its manufacturing method, with high whole transmission coefficient and having a very high ratio between the polarised luminous flux in one direction whose transmission is maximum and the polarised flux in the direction perpendicular whose attenuation is the strongest. Preferably, this ratio should be uniform over an extended spectral domain.

SUMMARY OF THE INVENTION

This invention relates therefore to a transmission-polarising filter comprising a substrate and a partially metallized grating, carried by said substrate.

According to the invention, the grating is a holographic grating having a profile with facets of slopes that are alternately positive and negative, whereas one of the sets of these facets with positive or negative slopes, is partially metallized.

In various embodiments, each exhibiting its specific advantages:

the profile of the grating is a sine wave, if the central wavelength of the useful bandwidth of the polariser is $\lambda$, the pitch of the grating is about $\lambda/2$, the depth of the lines of the grating is in the order of $\lambda/10$, the number of lines in the grating per mm ranges between 3,000 and 5,500, the modulation depth of the lines ranges between 30 and 70 nm, the metallic layer has a maximum thickness ranging between 10 and 40 nm.

The invention also relates to a manufacturing method of such a polarising filter, comprising the following steps:

manufacture of a holographic grating on a substrate, coating of a metallic layer with uniform thickness on the holographic grating, partial attack of the metallic layer by ionic machining.

In various preferred embodiments, each exhibiting their specific advantages:

the metallic layer is a silver layer, ionic machining is performed while tilting the substrate with respect to the ionic beam to 30–80°, the grating is formed in a layer of epoxy resin, the grating is formed in a photoresist layer.

BRIEF DESCRIPTION OF THE DRAWINGS

The invention will be described thereunder in detail, with reference to the drawings on which.

FIG, 1B represents the uniformly metallized grating.

Figure 1A:
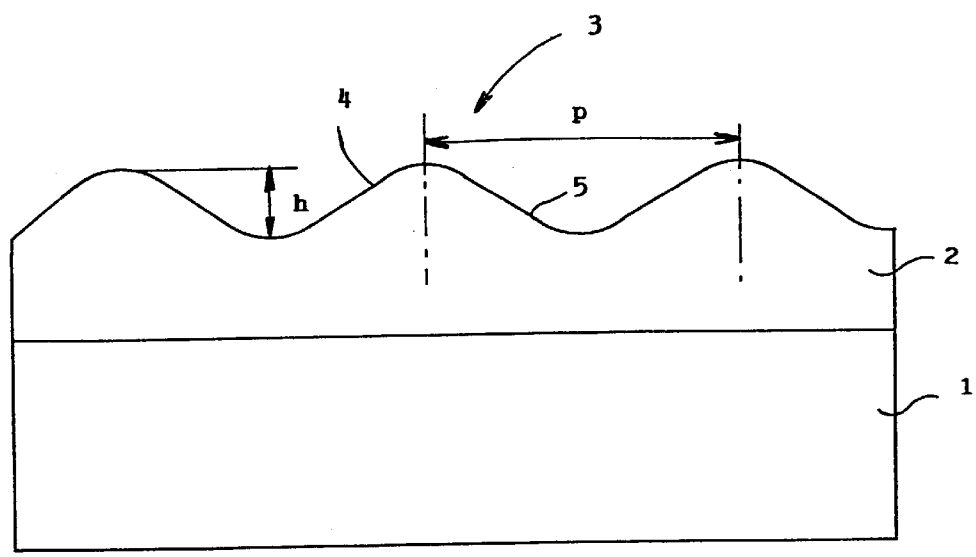
FIG. 1A represents the grating on its substrate.
Figure 1B:
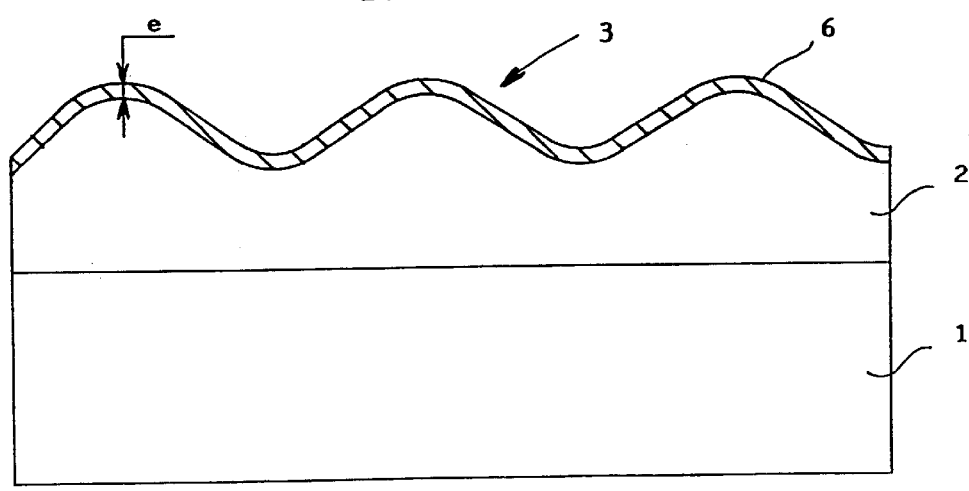
FIG. 1 illustrates the state of the future polariser during its manufacturing method
Figure 1C:
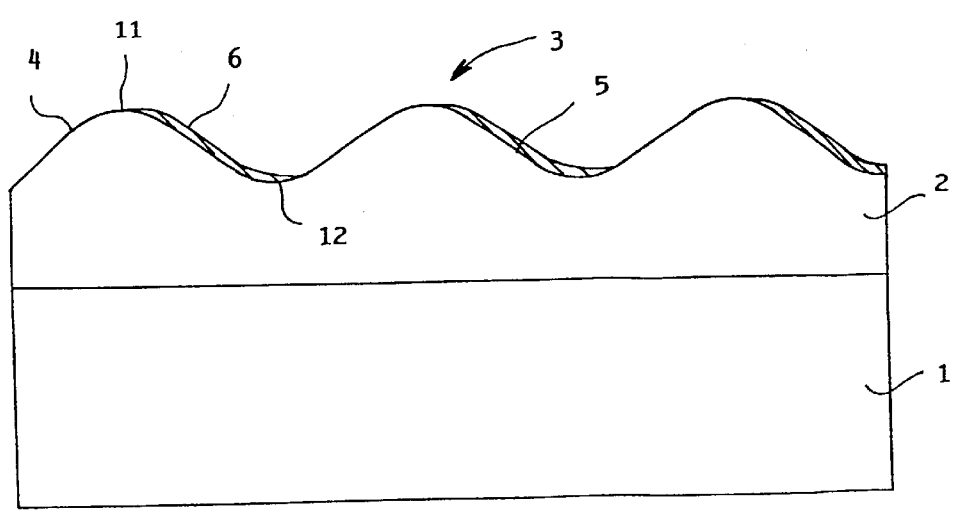

FIG. 1C represents the completed polariser, after ionic machining.

Figure 2:
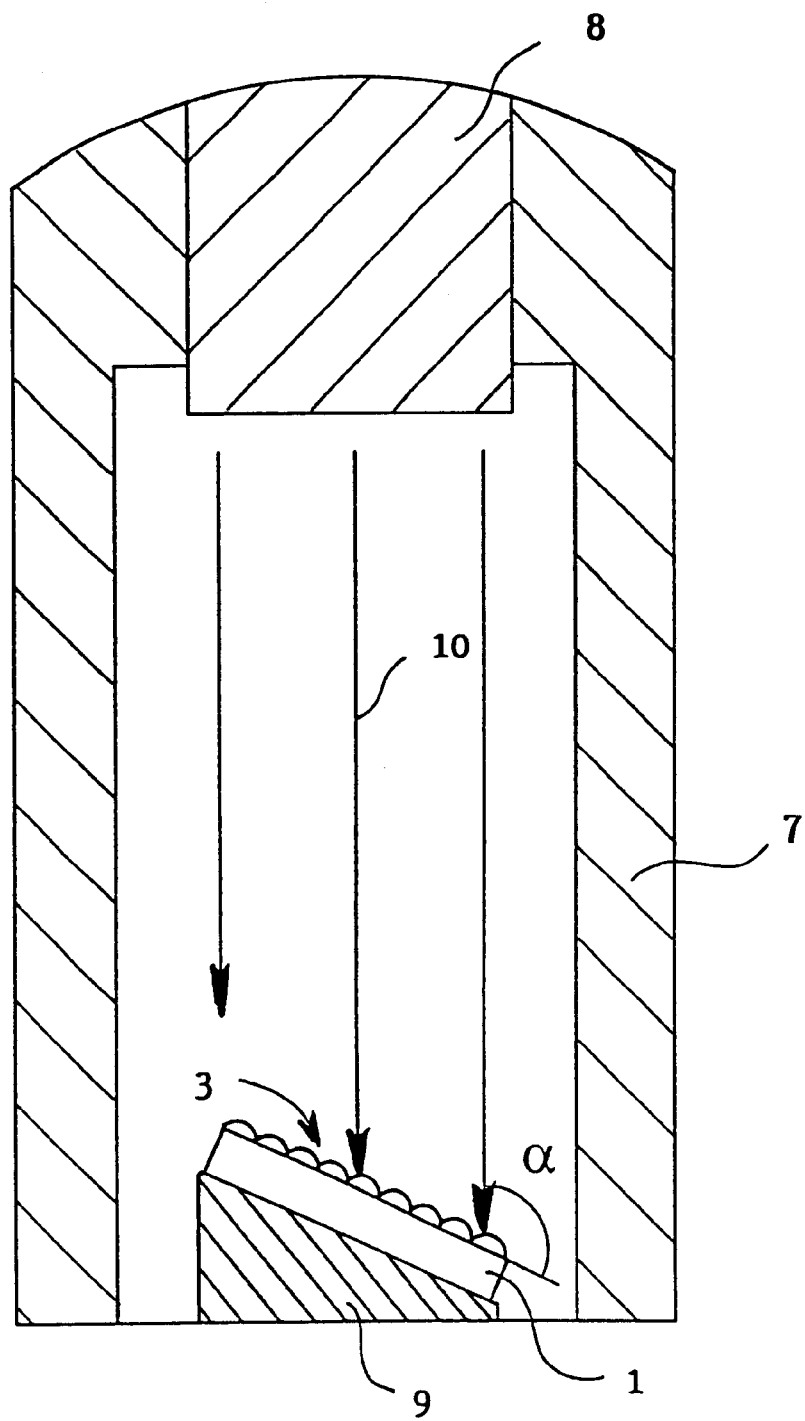

FIG. 2 represents an ionic machining installation of the polariser.

Figure 3A:
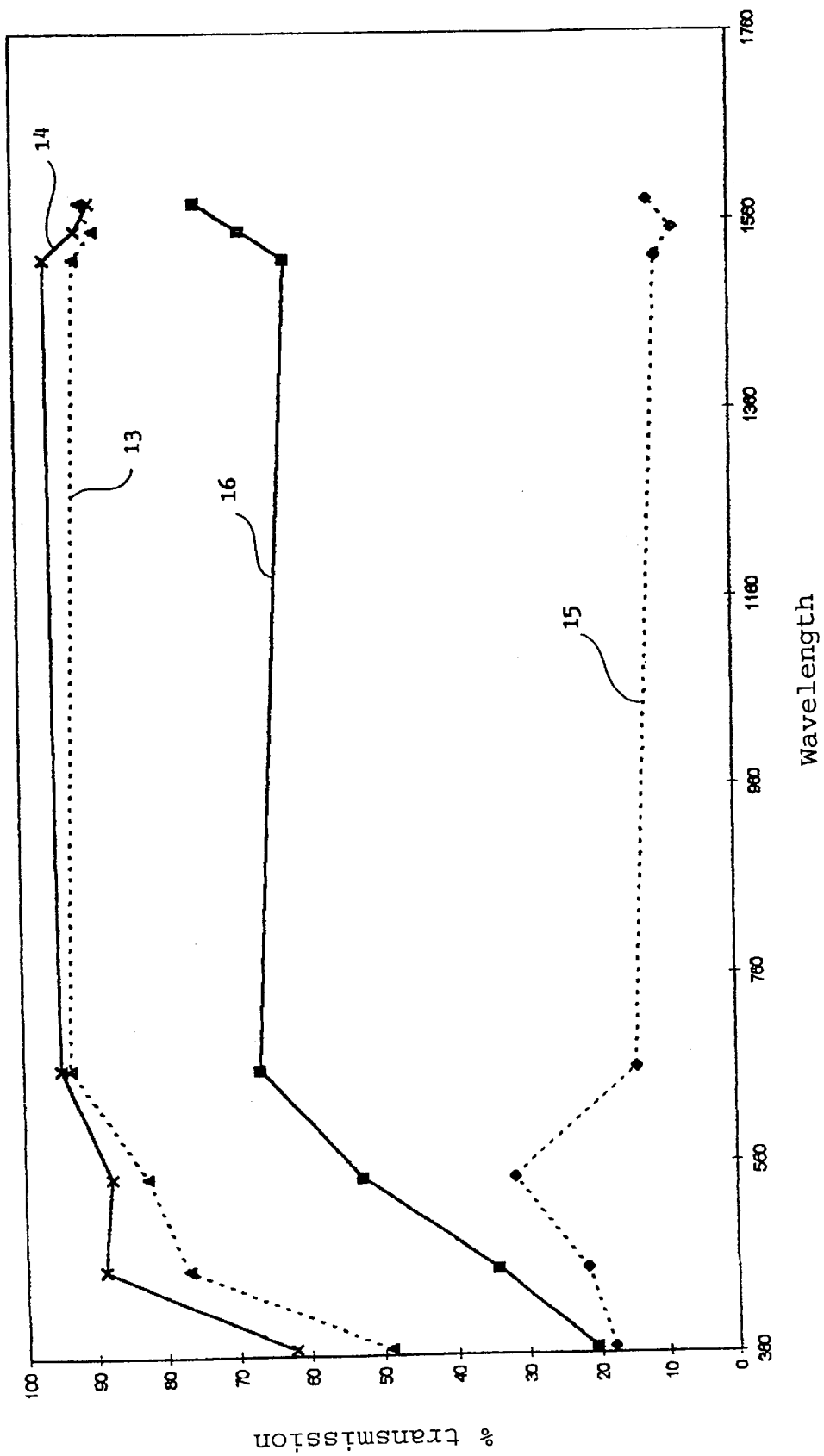
Figure 3B:
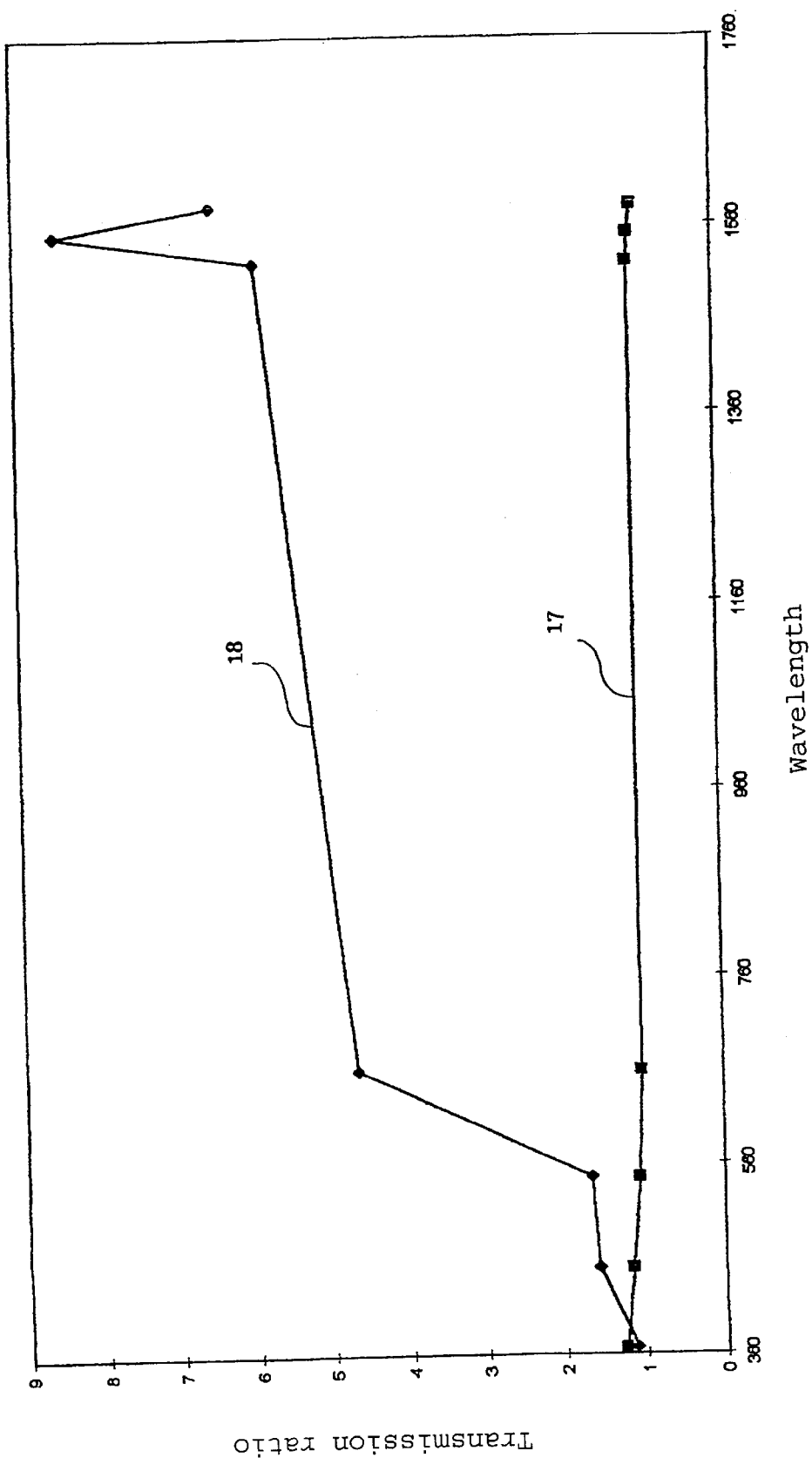

FIGS. 3A and 3B represent the comparison between the results obtained with a polariser according to a first embodiment of the invention and the results obtained with a non-metallized grating.

Figure 4A:
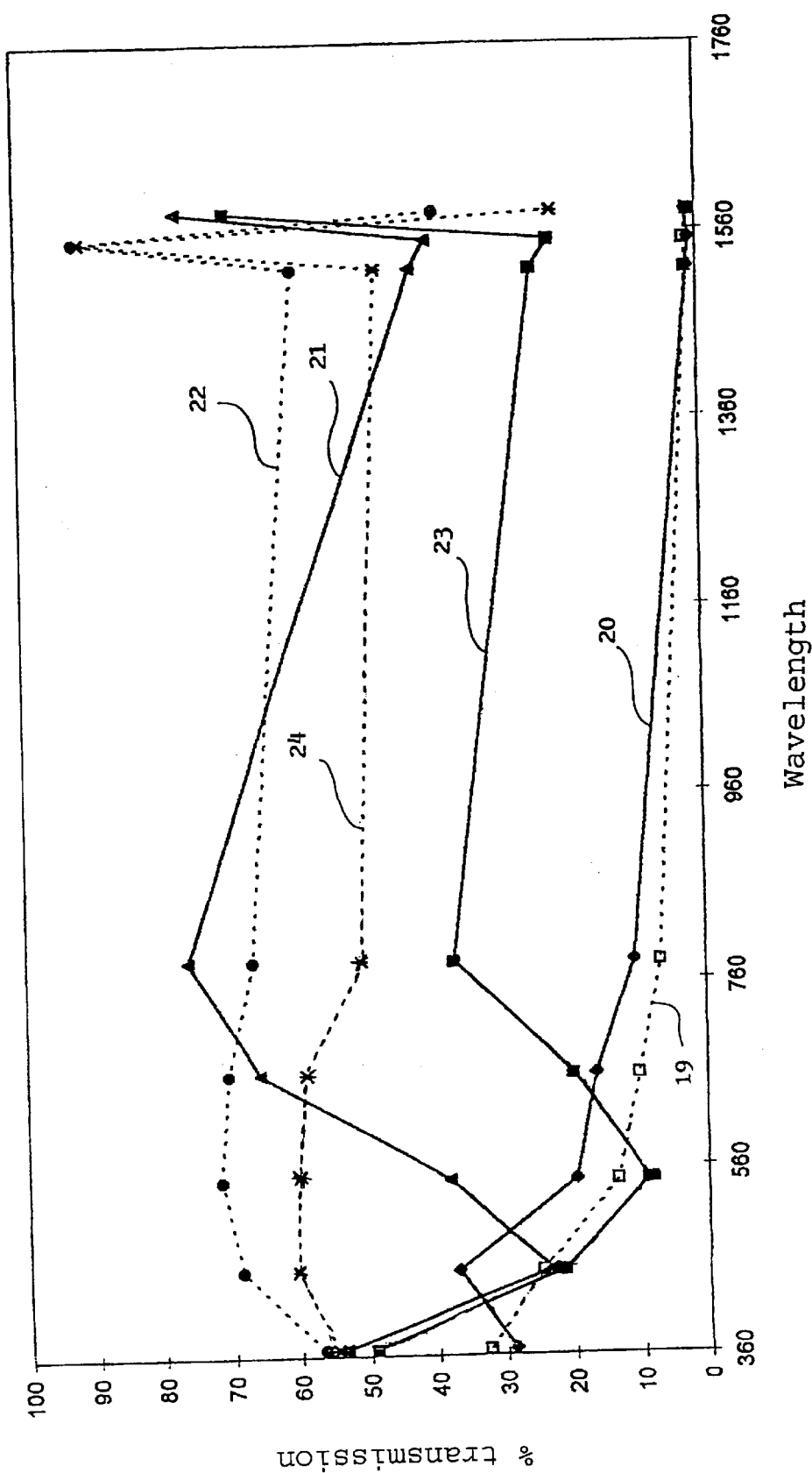
Figure 4B:
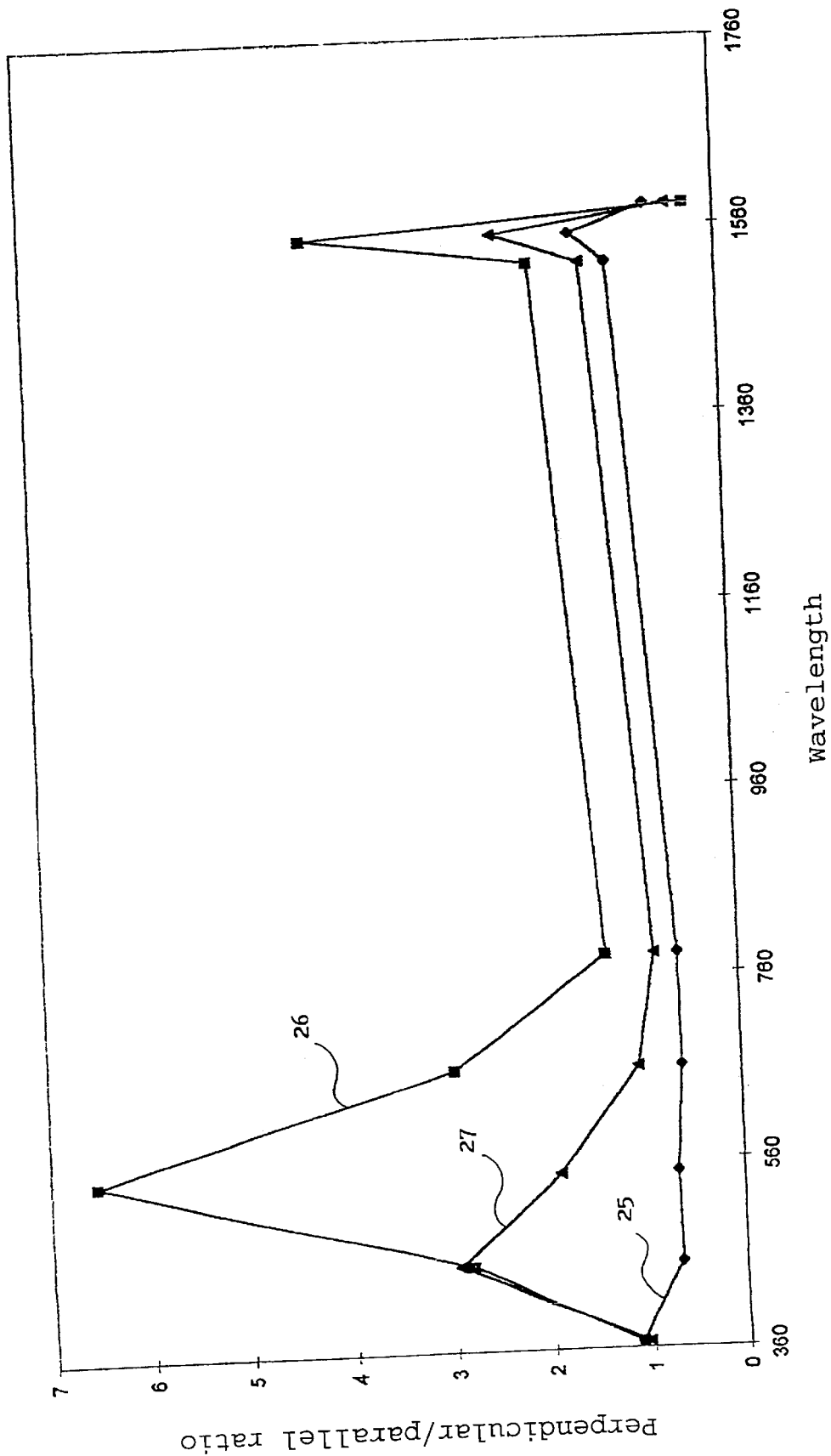

FIGS. 4A and 4B represent according to a second embodiment the comparison between the results obtained with a non-metallized grating and a fully metallized grating (before ionic machining).

DETAILED DESCRIPTION OF THE PREFERRED EMBODIMENT

The polarising filter of the invention is intended for operating over a particular wavelength range, centred on the wavelength $\lambda$.

According to the invention, this wavelength range should be long enough and the properties of the filter should be as uniform as possible over the whole extent of this range.

The substrate 1 is made in a material with a good transmission coefficient in this spectral domain and showing good dimensional thermal stability.

On this substrate 1 is formed a holographic grating 2 made conventionally either with a layer of epoxy resin or with a layer of photoresist. The materials are those widely used for the manufacture of holographic gratings. It should be referred to the article entitled 'New Vistas for Diffraction Gratings' by J. M. Lerner and J. P. Laude, published on May 31, 1983 in the Electro Optics magazine and to those that they mention in order to have further information on the said materials.

This holographic grating may be formed either directly in this photosensitive layer or using a matrix of which it then constitutes a replica. Its profile is advantageously a sine wave, however, owing to the evolution of the techniques and of the economic costs, it is possible, without departing from the scope of the invention, to use more sophisticated profiles, also accessible by the conventional methods for manufacturing holographic gratings.

The pitch of the grating is such that it does not produce any wavelength dispersion that can be observed in the considered wavelength range.

The profile 3 of the grating 2 comprises facets with opposite slopes, alternately positive 4 and negative 5.

This grating is coated with a metallic layer 6 with uniform thickness e represented on FIG. 1B. This coating is obtained by the usual vacuum metallic coating techniques.

The grating 2 thus metallized is subjected to ionic machining under a tilting angle ranging between 30 and 80°, preferably in the order of 55°.

It goes without saying that this angle is the one formed by the supposedly plane substrate, eventually approached by the tangent plane at its apex, and is the ionic beam.

An ionic machining installation is represented on FIG. 2; it comprises a casing 7, an ionic source 8 and a sample-holder 9. The sample-holder 9 has a geometrical configuration so that it enables realising the tilting angle $\alpha$ between the direction of the ionic beam 10 and the plane of the substrate 1.

This arrangement enables to obtain the profile that is substantially represented on FIG. 1C for the metallic layer 6. This layer has vanished completely from the faces 4 with positive slope and exhibits on the faces 5 with negative slope, an increasing thickness from the apex 11 of a line of the grating and decreases again at the hollow 12.

Two embodiments will be mentioned below to underline the quality of the results thus obtained. In both cases, the polarisers realised are intended for operation in a spectral domain extending around the visible ultraviolet at near infrared.

|  | First example | Second example |
|---|---|---|
| Number of lines per mm | 2,400 | 4,320 |
| Angle of incidence of the ionic treatment | 50–60° | 50–60° |
| Figures | 3A–B | 4A–B |

FIG. 3A represents the transmission coefficient of each of the linear polarisations foreseen respectively parallel and perpendicular of the polariser of FIG. 1 in relation to the wavelength represented in abscissa.

The curves 13 and 14, used for reference purposes, are the transmission curves, respectively of the parallel and perpendicular polarisations in the absence of metallic treatments. The polariser of the invention enables to obtain transmission coefficients for the respectively parallel and perpendicular polarisations referred to as 15 and 16.

FIG. 3B represents the transmission ratios obtained respectively without any treatment, therefore referred to, 17 and with treatment, according to the invention, referred to 18.

It appears clearly that the polariser of the invention enables to obtain a transmission ratio with relatively stable output, ranging from 580 to 1500 nm, with high value of approximately 5.

FIGS. 4A and 4B are analogous representations corresponding to the grating mentioned in the example 2 with a third reference constituted by a grating of the same geometrical, fully metallized, configuration.

The curves 19 and 20 are transmission curves for a fully initialized grating, the curves 21 and 22 are the curves obtained with a fully attached coating grating and the curves 23 and 24 are those obtained according to the invention.

FIG. 4B represents the transmission ratios between the polarised fluxes respectively parallel and perpendicular, the curve 25 represents this ratio in the absence of any treatment, the curve 27 in the presence of a complete metallization and the curve 26 according to the invention.

In order to improve the properties of the polariser, two gratings can be formed advantageously, each partially metallized, arranged on one face of the substrate. The ratio of the transmission output of the polarisations is then increased.

The spectral domain of use of the polariser can thus be extended. To this end, whereas we have considered so far a perfectly periodic grating, we can also make a grating with slow variation of its period in the direction perpendicular to the lines. This progressive variation is sufficiently slow so that, locally, in a given zone, the grating seems to be periodic, but sufficiently significant so that the corresponding period differs from one area to the next. The spectral properties of the other areas are then slightly different from one another and the properties of the polariser, as a whole, correspond to the cumulated properties of these areas.

What I claim is:

1. A transmission-polarising filter comprising a substrate and a partially metallized grating carried by said substrate wherein the grating is a holographic grating, having a profile with apexes and hollows separated by facets with, alternately, positive slopes and negative slopes, wherein one of both sets of these facets with positive or negative slopes is partially metallized, whereby metallization is with increasing thickness starting from the apex toward the hollow and decreasing again at the hollow toward the facet with opposite slope, while the other set is substantially free of metallization.

2. A polarising filter according to claim 1, wherein the pitch of said grating of said filter, said filter having a useful spectral bandwidth centered on $\lambda$, is on the order of $\lambda/2$.

3. A polarising filter according to claim 2, wherein the modulation depth of said grating of said filter, said filter having a useful spectral bandwidth centered on $\lambda$, is on the order of $\lambda/10$.

4. A method for manufacturing a polarising filter according to claim 1, comprising the following steps:

manufacture of a holographic grating on a substrate, coating said holographic grating with a metallic layer of uniform thickness, partially attacking said metallic layer by ionic machining.

5. A method according to claim 4, wherein the metallic layer is a silver layer.

6. A method according to claim 4, wherein the ionic machining is made by tilting the substrate with respect to the ionic beam ranging between 30 and 80°.

7. A method according to claim 4, wherein the grating is formed in a layer of epoxy resin.

8. A method according to claim 4, wherein the grating is formed in a layer of photoresist.

9. A polarizing filter according to claim 1, wherein the profile of said grating is a sine wave.

10. A polarising filter according to claim 1, wherein said grating is formed on each face of said substrate.

* * * * *